United States Patent [19]

Weidenmiller

[11] 3,756,111

[45] Sept. 4, 1973

[54] WIRE HOLDING ATTACHMENT FOR EXTRUSION MACHINES

[76] Inventor: Edward A. Weidenmiller, 8100 Austin Ave., Lincolnwood, Ill. 60053

[22] Filed: Dec. 13, 1971

[21] Appl. No.: 207,182

[52] U.S. Cl.............. 83/651.1, 83/307.1, 83/581.1, 83/698
[51] Int. Cl............................................. B26d 1/02
[58] Field of Search..................... 83/307.1, 307.2, 83/307.3, 651.1, 581.1, 542, 698; 425/311

[56] References Cited
UNITED STATES PATENTS

| 391,698 | 10/1888 | Frey | 83/307.1 |
| 852,107 | 4/1907 | Cunningham | 83/651.1 |
| 2,838,013 | 6/1958 | Weidenmiller et al. | 425/311 |
| 2,232,122 | 2/1941 | Lindman | 83/651.1 |
| 1,555,769 | 9/1925 | Steele | 83/651.1 |

Primary Examiner—Willie G. Abercrombie
Attorney—Robert C. Brown, Jr. et al.

[57] ABSTRACT

A wire holding attachment for a dough extrusion machine including a dough cutting wire of predetermined length disposed taut between supporting posts where it is resiliently attached by means of wire tensioning springs with a shock absorber disposed between each tensioning spring and its respectively associated supporting post.

4 Claims, 4 Drawing Figures

WIRE HOLDING ATTACHMENT FOR EXTRUSION MACHINES

BACKGROUND OF THE INVENTION

Heretofore the usual dough extruding machine has included a dough cutting wire which was anchored at one end and adjustably secured at its opposite end by means of ratchet mechanism which enabled the tension on the wire to be tightened but did not provide for any resilience in the attachment. The wire was maintained taut by the ratchet mechanism which was adjusted to the tightness of the wire necessary for it to perform its function during the cutting cycle. Consequently the wire was subjected to stresses from improper adjustments and stress points which frequently resulted in breaking of the wire with an attendant loss of operating time for replacing the broken wire. Breakdowns due to this type of failure entailed extensive loss of material due to the time required for replacement of the cutting wire because of the manner of installing wires of the type previously used. It was necessary to cut a wire to the proper length, anchor it at one end in the machine, secure it to the ratchet mechanism at its opposite end, and then adjust the ratchet to fix the tautness of the wire.

It was necessary to clean uncut dough from the delivery belt underlying the machine before the machine could again be placed in operation. The resulting loss of oven time during this period may amount to approximately one hundred to five hundred feet of the product traveling through the oven representing baking time lost. All of this causes the packaging machines and equipment normally operating after the baking operation to be shut down so that the total loss extends to the complete processing of the product from the cutting operation, through the baking operation and to the packaging operation.

Conventional wire cutting machines utilized some auxiliary mechanism for releasing dough blanks from the cutting wire. Frequently this took the form of special vibrators or oscillating devices for activating the wire to dislodge dough blanks therefrom. However, such devices did not include an ability to compensate for differences in various dough textures where the consistency may vary over a wide range as a result of using nut meats, fruit bits, coconut, rough spices or syrups in the dough mixture. The prior devices did not have any tolerances for cutting a wide variety of such doughs without undue strain on the cutting wire.

OBJECTS OF THE INVENTION

It is the principal object of this invention to provide a cutting wire attachment for dough extruding machines having sufficient flexibility to cut doughs of varying texture and consistency and automatically compensating for such dough variations by means of a dynamically supported wire.

An important object of the invention is the provision of a cutting wire for dough extruding machines mounted in wire tensioning springs at opposite ends of the wire.

Another object of the invention is to provide a cutting wire for dough extruding machines resiliently mounted at its opposite ends and having a shock absorber associated with each resilient mounting.

A further object of the invention is the provision of a cutting wire for dough extruding machines wherein the wire is of a fixed predetermined length to extend between and precisely fit the dimension between a pair of resilient end mountings therefor.

A still further object of the invention is to provide a cutting wire of predetermined length for dough extruding machines designed for quick replacement by ready attachment to resilient end mountings.

Still another object of the invention is the provision of resilient end mountings for the cutting wire of dough extruding machines wherein vibrations are set up in the wire during the cutting cycle.

A more specific object of the invention is to provide a resilient cutting wire attachment for dough extruding machines utilizing a cutting wire of predetermined length extending between and mounted in resilient end attachments and having a plurality of supports intermediate the ends of the wire defining dough cutting positions therebetween wherein the wire may adjust to varying consistencies of the dough at the several cutting positions.

DESCRIPTION OF THE DRAWINGS

The foregoing and other and still more specific objects of the invention are attained by the structure and arrangement illustrated in the accompanying drawings wherein.

SUMMARY OF THE INVENTION

Figure 1:
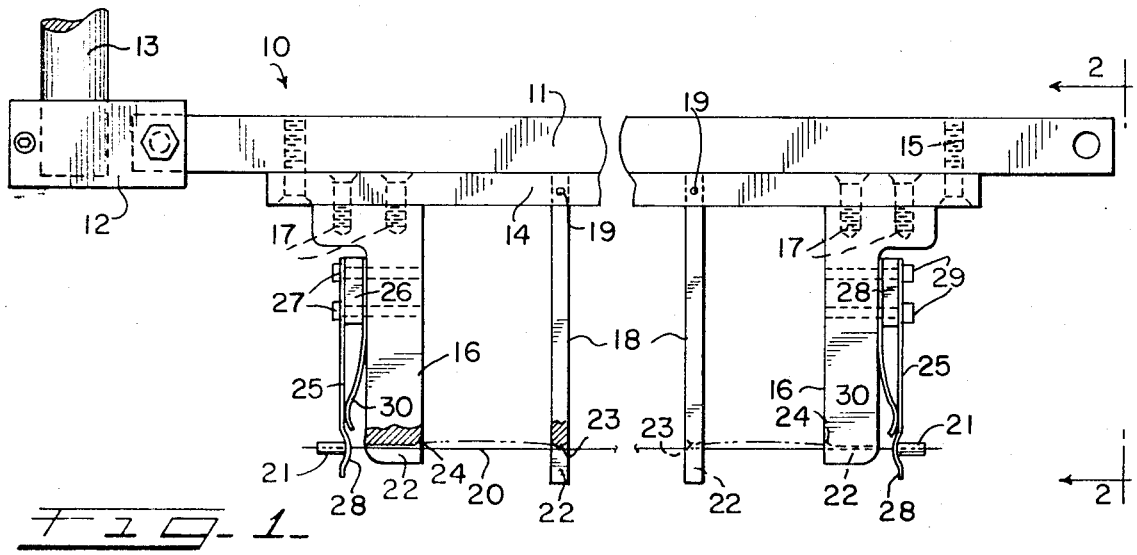
FIG. 1 is a general plan view of the preferred form of cutting bar assembly including the cutting wire installation of this invention.

This is a cutting wire holding attachment for dough extruding machines utilizing a taut wire for cutting the dough into a plurality of blanks as it is extruded continuously through openings in a die plate. The cutting wire is mounted at its respectively opposite ends in rigid post members by means of resilient devices comprised of a wire tensioning spring and a shock absorber at each post mounting.

The cutting wire assembly, including the rigid posts, is carried by a cutting bar frame that moves in a forward direction during the cutting operation, making surface contact with the bottoms of the extrusion die openings as the wire cuts a plurality of dough blanks from the dough being extruded through the openings. The movement of the cutting bar frame actually is orbital so that the cutting wire moves forward through the cutting area, then downwardly and back, where it rises again to move across the extrusion openings.

The cutting wire is supported at spaced intervals throughout its length between the rigid posts by means of stems or fingers that are slotted for entry of the wire into the ends thereof. These supports prevent the cutting wire from excessive deflection as contact is made with the bottom surface of the die opening and buildup of pressure encountered when the wire passes through the dough extrusions. However, the resilient end mountings of the cutting wire permits the wire to flex between respectively spaced pairs of the support stems where it engages the dough extrusions and this flexure may vary from one position to another as the consistency of the dough varies according to concentrations of nuts, raisins, coconut, etc in the several extrusions, resulting in different degrees of resistance at the several positions. The resilient mounting of the cutting wire thus affords plus and minus tolerances for cutting a wide variety of dough textures without overstressing the wire.

The resilient end mounting and shock absorber arrangement provides a dynamic wire having a built-in or inherent vibration characteristic which facilitates release of the dough blanks from the wire without the necessity for special vibrating apparatus to impart vibrations to the wire. It will be seen that when the wire is deflected at the several dough cutting positions, as it passes through the dough, it will always be under the tension created by the end mounting springs so that upon approaching the completion of its passage through the extrusion it will be snapped taut by the action of the springs, thus vibrating the wire and thereby releasing the dough blanks. This occurs automatically to release each successive series of dough blanks.

DESCRIPTION OF PREFERRED EMBODIMENT

The present invention is related to the Cookie Forming Machine of prior U.S. Pat. No. 2,838,013 of June 10, 1958 to Robert M. Weidenmiller and Jack E. Weidenmiller and represents an improvement in the cutting wire assembly of the prior machine. The disclosure of said patent is hereby incorporated by this reference.

As shown in the drawings the cutting bar assembly 10 is generally similar to the cutting bar assembly disclosed in tha patent above referred to and functions generally in the same manner, moving the cutting wire in an orbital path to avoid interference with the dough extrusions on the return stroke after the cutting stroke. The cutting bar assembly comprises a finger bar holder 11 which, as shown in the above patent extends transversely of the machine and is connected at its opposite ends, by means of couplings 12, to outer bar supporting frame side arms 13 for actuation thereby in performing the cutting operation. A finger bar 14 is secured rigidly to the finger bar holder 11 by means of bolts 15 having countersunk heads disposed flush with the surface of the finger bar, which extends for substantially the major part of the length of the finger bar holder 11. A pair of finger bar truss members 16 are assembled on the finger bar 14 adjacent to the opposite ends thereof prior to its attachment to the finger bar holder 11. Bolts 17, having countersunk heads disposed flush with the finger bar surface next to the finger bar holder rigidly secure the truss members 16 to the finger bar 14. A plurality of stems or fingers 18 are mounted rigidly in the finger bar 14 and secured in place by pins 19. The fingers 18 are disposed at regularly spaced intervals between the truss members 16.

The foregoing cutting bar assembly, as thus far discribed, may be said to be typical of this type of cutting bar arrangement as used heretofore. However, this invention provides a new cutting wire which is original in concept and a new mounting arrangement for the cutting wire that is also original in concept. It is important to note that the cutting wire 20 is of a predetermined fixed length which is made possible in the application of the wire to the cutting bar assembly, through the medium of the new wire mounting arrangement. The wire 20 is designed to be used in a straight length of fixed dimension which is defined by end stop members 21 fixed in position on the wire adjacent respectively opposite ends by means of welding or brazing so that the attachment of the stops on the wire represents a permanent and what might be described as an integrated securement so that to all intents and purposes the cutting wire 20 together with end stops 21 comprises an integral assembly of fixed length.

As best shown in FIG. 1, both of the finger bar truss members 16 and all of the intermediate finger members 18 are provided with slots 22 in their end portions and all of which are disposed in alinement across the several members. The wire 20 extends through these slots in a straight line, as installed, but may be deflected into the space between any adjacent pair of the members 16 and 18 by the pressure of the dough or variations in pressure at the several positions developed during the cutting operation. Such deflection is indicated by the dotted line illustration of the cutting wire in FIG. 1. It should be noted that such deflection does not occur at sharp corners, which would cause a stress rise at each such point of bending of the wire, but the fingers 18 are provided with rounded portions 23 where the wire 20 extends therearound during deflection so that such stress risers are avoided. Similarly, the slots 22 in both of the truss members 16 are rounded, as at 24, at the inner face of each such member so that here too an excessive rise in stress is avoided. The wire 20 at all of these points is deflected around smoothly rounded portions which avoid the necessity for any sharp bends in the wire at any point.

Figure 2:
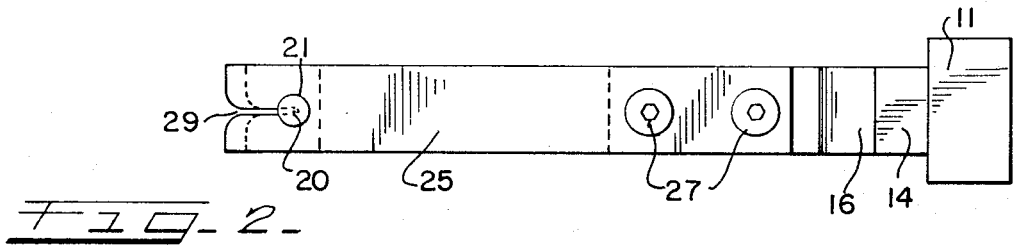
FIG. 2 is a side elevational view of the cutting bar assembly to larger scale and showing it as it appears from the line 2—2 of FIG. 1.

A primary feature of great importance in the mounting of the wire 20 in the truss members 16 resides in the provision of resilience in the mounts supporting the wire in the truss members. It is this resilience that enables the utilization of a cutting wire of predetermined fixed length. As shown in FIGS. 1 and 2, the respective mounts for the cutting wire each comprise a metal leaf type spring 25 mounted in spaced relation to the respective finger bar truss members 16 at the outer side thereof by means of spacer blocks 26 and secured by bolts 27 threaded into the respective truss members. The metal springs 25 extend parallel to the outer face of the respectively associated truss members and are each provided with an inwardly offset recess 28 which affords a seat for each of the end stops 21 on the cutting wire thus positioning the wire and normally retaining the wire against displacement. The spring 25 is provided with a slot 29 (see FIG. 2) for entry of the cutting wire 20 into the retaining recess 28, one or both springs being compressed to enable the wire thus to be inserted when installing the wire originally or upon the installation of a replacement wire.

Each of the springs 25 is supplemented by a shock absorber spring 30. This shock absorber also comprises a leaf type metal spring and is mounted between the respective spacer block 26 and the associated truss member 16 and secured by the same bolts 27. The shock absorber springs each bear against the outside face of the associated truss member and curve outwardly therefrom to a reversely curved end portion having bearing engagement with the inside surface of the spring 25. The shock absorber springs 30 thus back up the primary springs 25 and serve to increase the spring pressure exerted on the cutting wire and maintain the wire under constant tension. It will be noted too that when the cutting wire 20 completes its cutting stroke through the dough and the pressure exerted by the dough on the wire because of resistance to passage of the wire, is suddenly released, the wire 20 will be snapped back from the deflected position indicated in dotted lines to the full line straight position and set up a dynamic vibration in the wire, due to the tension exerted by the springs 25 and shock absorbers 30, whereby the cut dough blanks will be shaken loose from the wire to drop ont the surface intended therefor.

Figure 3:
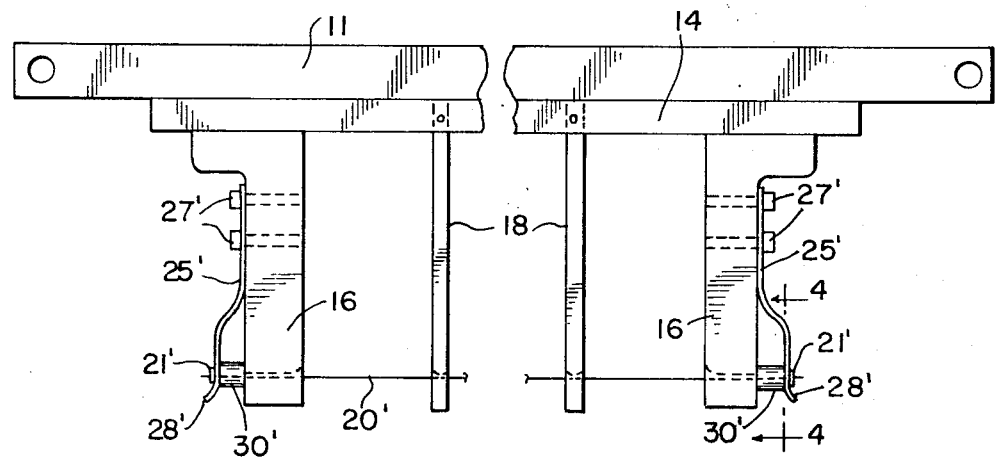
FIG. 3 is a general plan view similar to FIG. 1 but illustrates a modified form of the cutting wire installation as comprehended by this invention.
Figure 4:
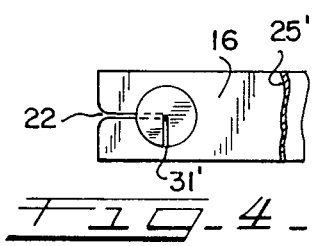
FIG. 4 is a fragmentary detail view in elevation as taken from the line 4—4 of FIG. 3 showing the manner of applying the non-metallic shock absorber used in this species.

The modified version of the invention as represented by the species illustrated in FIGS. 3 and 4 functions in the same manner as the preferred form of the device as heretofore described. The finger bar holder 11, finger bar 14, finger bar truss members 16 and fingers 18 all are constructed and assembled in the same manner as in the previous form. The arrangement of these parts is identical with that previously described and the functions thereof also are the same. The resiliently mounted cutting wire however, while not differing in principle, takes a somewhat different form, particularly in respect to the springs used and the shock absorbers. The metal springs 25' are secured directly to the outside face of respectively associated truss member 16 by means of bolts 27'. The springs 25' are offset outwardly intermediate of their length, in spaced relation to the outer face of the associated truss members 16 and terminate in outwardly curved end portions 28' which define seat portions for the end stop members 21' on the cutting wire 20'. The springs 25' at their end portions 28' are each provided with a slot similar to the slotted arrangement of the spring in the previous form for the insertion of the cutting wire, one or both springs being compressed to insert the wire. This species of the invention utilizes a non-metallic shock absorber in the form of a rubber bushing-like member 30' disposed between the inner face of each spring 25' and the opposing face of the truss member 16. The rubber shock absorber 30' is slotted as at 31' and is slipped over the wire 20' after the wire is installed in the seats 28'. Thus the rubber shock absorber is disposed between the opposing faces of the springs 25' and respectively associated truss members and functions in the same manner as the shock absorber previously described to supplement the springs 25' in maintaining the cutting wire 20' under constant tension. The end stops 21' of this species differs somewhat from that of the preferred form but is secured to the wire permanently in the same manner and functions in the same manner.

The utilization of a cutting wire of fixed predetermined length affords great economic advantage and simple servicing in the maintenance and repair of machines with broken cutting wires. Instead of the previously costly and time consuming cutting, installation and adjustment of a new wire by the complicated method previously used the present design provides an arrangement where the wire is merely snapped into place. The assembly of the cutting wire and end stops in predetermined standard length in combination with the resilient mounts for the wire provides an improved operating wire as well as affording the advantages and economies of easy installation and replacement.

What is claimed is:

1. A wire holding attachment for a dough extruding machine including a pair of spaced apart rigid post members, a cutting wire extending continuously between said post members, means attaching respectively opposite ends of said cutting wire to respectively associated post members including wire-tensioning spring means mounting said cutting wire to at least one of said post members, and a resilient shock absorber means mounted between said spring means and said one post member.

2. A wire holding attachment for a dough extruding machine as set forth in claim 1 wherein said shock absorber means mounted between said spring means and said post member is non-metallic.

3. A wire holding attachment for a dough extruding machine as set forth in claim 2 wherein non-metallic shock absorber means is disposed between said spring means and each of the respectively associated post members.

4. A wire holding attachment for a dough extruding machine as set forth in claim 3 wherein said non-metallic shock absorber means are each provided with a slot and said cutting wire extends through each said slot.

* * * * *